No. 649,899. Patented May 22, 1900.
H. M. BRENENSTUL & A. M. CARPENTER.
COMPENSATING GEAR.
(Application filed Dec. 20, 1899.)

(No Model.)

Witnesses
John Maupin
Geo. H. Chandler

Henry M. Brenenstul
Alvin M. Carpenter
Inventors

By their Attorneys,
C. A. Snow & Co.

THE NORRIS PETERS CO., PHOTO-LITHO., WASHINGTON, D. C.

UNITED STATES PATENT OFFICE.

HENRY M. BRENENSTUL, OF WAKEMAN, AND ALVIN M. CARPENTER, OF CLEVELAND, OHIO.

COMPENSATING GEAR.

SPECIFICATION forming part of Letters Patent No. 649,899, dated May 22, 1900.

Application filed December 20, 1899. Serial No. 741,057. (No model.)

*To all whom it may concern:*

Be it known that we, HENRY M. BRENENSTUL, residing at Wakeman, in the county of Huron, and ALVIN M. CARPENTER, residing at Cleveland, in the county of Cuyahoga, State of Ohio, citizens of the United States, have invented a new and useful Compensating Gear, of which the following is a specification.

This invention relates to gearing in general, and more particularly to that class known as "compensating gearing," one object of the invention being to provide a construction particularly adapted for use upon automobiles and upon other vehicles that are self-propelled and in which the wheels may be so connected with the driving-shaft as to prevent slipping of the wheel when turning corners and consequent wear upon the parts, a further object being to avoid the necessity of forming a two-part axle, as is the common practice.

Figure 1:
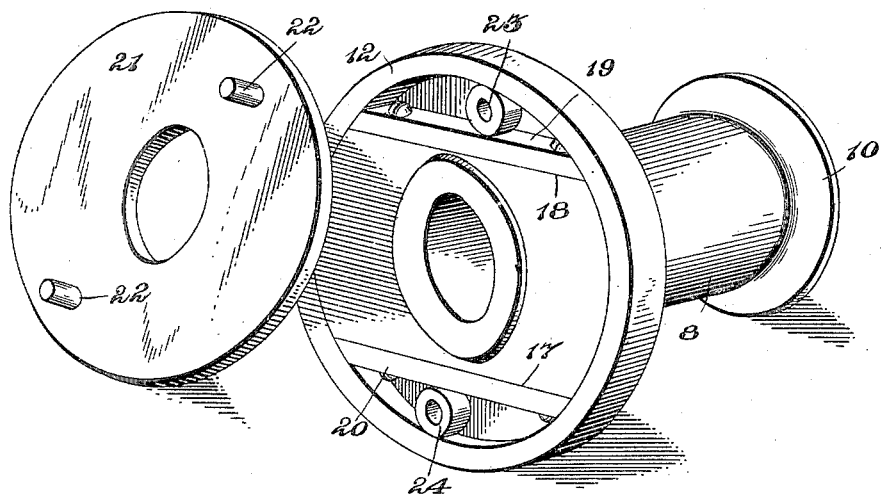
Figure 2:
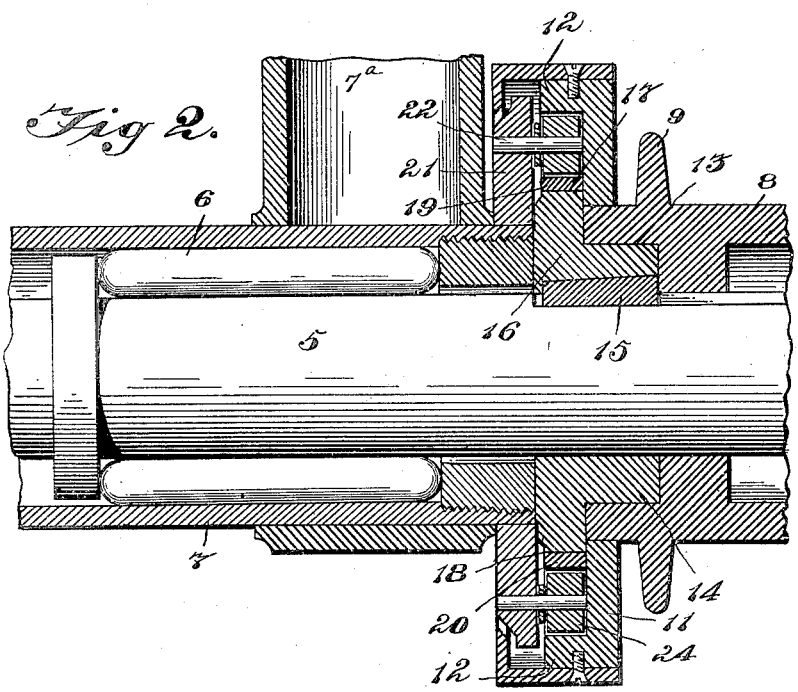

In the drawings forming a portion of this specification, and in which similar numerals of reference designate like and corresponding parts in both views, Figure 1 is a perspective view showing a wheel-hub equipped in accordance with the present invention and showing the roller-disk removed to disclose the mechanism. Fig. 2 is an enlarged longitudinal section of the rear portion of a hub and the adjacent shaft-bearing, the shaft being shown in elevation.

Referring now to the drawings, 5 represents the power-shaft of a motor-vehicle, to which the power is supplied from the motor to the wheels, and which shaft is mounted in roller-bearings 6, disposed in a journal-box 7 upon the frame of the vehicle. Upon the power-shaft 5 is loosely mounted a wheel at each end, and each of which wheels comprises a hub 8, having inner and outer flanges 9 and 10, to which the spokes of the wheel are attached in the usual manner. At the inner end of the hub 8 and beyond the flange 9 is a radial flange 11, which may be secured to or formed integral with the hub and which extends beyond the periphery of the flange 9, this flange 11 having a flange 12 upon its rear face extending parallel with the power-shaft 5. In the rear end of the hub 8 is a recess 13, concentric with the hub and extending to a point beneath the flange 9, and which recess receives a ring 14, which is secured to the shaft 5 through the medium of a key 15, this ring extending rearwardly beyond the rear end of the hub 8 and having a radial flange 16 upon this rearwardly-extending portion. The flange 16 is flattened, as shown at 17 and 18, at diametrically-opposite points, while the intermediate portions of the periphery of the flange are arc-shaped and are adapted to fit snugly against the inner periphery of the flange 12. Upon the flattened faces 17 and 18 are secured wear-plates 19 and 20, for a purpose which will be presently described.

The rear end of the ring 14 is separated from the adjacent end of the journal-box hanger 7ª by an interspace, and in this interspace is disposed a carrier-disk 21, rotatably mounted upon the end of the journal-box and lying against the lower portion of the journal-box hanger. At opposite points on the face of the carrier are disposed bearing-pins 22, which project into the interspaces between the bearing-plates 19 and 20 and the adjacent portions of the flange 12. Upon these pins are loosely mounted clutch-rollers 23 and 24, which lie in the said interspaces and are adapted to wedge between the wear-plates and the flange 12 to rotate the wheel with the shaft.

A dust-ring 30 is secured upon the outer periphery of the flange 11 and extends in the direction of the hanger 7ª, the edge of the ring adjacent the hanger having an inwardly-directed flange which closely encircles the carrier 21 to prevent access of dust to the clutch-rollers and other parts of the mechanism.

The operation of this construction is as follows: When running straight ahead, both wheels are rotated with the shaft, due to the movement of the ring 14 with the shaft, this ring being clutched to the flange 12 through the medium of the rollers 23 and 24. The friction of the carrier-disk 21 upon the end of the journal-box is sufficient to retard the movement of the carrier-disk under the influence of the shaft 5, so that the rollers 23 and 24 will move to the position shown in Fig. 1 when the vehicle is first started in one direction. If then for any reason the wheel should tend to turn faster than the shaft 5, the movement of the flange 12 with respect to the wear-plates 19 and 20 would tend to roll the rollers 23 and 24 from their wedging positions shown in Fig. 1 to an extent sufficient to permit the flange 12, and therewith the hub 8 and the wheel, to move freely. It is of course understood that the disk 21 tends to stand still upon the end of the box 7 and is only rotated when the wear-plates 17 and 18 engage against the rollers. If then the parts be in the positions shown in Fig. 1—that is, if the rollers be in the positions shown in said figure and the ring 14, with its flange 16, is rotated to the right—then the engaging portions of the wear-plates will move from the clutching-rollers and their opposite ends will subsequently move against the rollers, so that the left-hand end of plate 18 and the right-hand end of plate 17 will engage the rollers. During this action the disk 21 does not move and the ring 12 slides over the rollers, which at that time act as idlers. When the rollers again engage, the direction of rotation of ring or flange 12 is reversed, and should the ring or flange then run faster than portion 16 in its new direction it will run freely over the rollers, for the reason that the carrier is never moved excepting under the influence of the engagement of the wear-plates with the rollers. It will thus be seen that in turning corners the inside wheel may rotate with the shaft, while the outside wheel may rotate at a greater speed, and that when the direction of movement of the vehicle is changed the wheel which was the inside wheel may become the outside wheel and then rotate at a greater speed than the shaft, while the wheel that was the outside wheel may become the inside wheel and rotate at the same speed with that of the shaft.

It will of course be understood that in practice the specific structure herein shown may be altered, and that any suitable materials and proportions may be employed for the different parts without departing from the spirit of the invention.

What is claimed is—

1. The combination with a journal-box and a shaft journaled therein, of a wheel comprising a hub mounted loosely upon the shaft, a flange carried by the hub and extending rearwardly thereof and concentric with the shaft, a ring fixed to the shaft and lying within the inclosure of the flange, said ring having flattened portions at opposite points of its periphery resulting in segmental interspaces between the ring and flange, a carrier frictionally mounted upon the journal-box and rotatable with respect thereto, and rollers carried by the carrier and lying in the interspaces, said rollers being adapted to wedge between the flange and the flattened portions of the ring alternately at opposite ends of the latter.

2. The combination with a journal-box and a shaft journaled therein, of a wheel comprising a hub mounted loosely upon the shaft, a flange carried by the hub and extending rearwardly thereof, and concentric with the shaft, a ring fixed to the shaft and lying within the inclosure of the flange, said ring having flattened portions at opposite points of its periphery resulting in segmental interspaces between the ring and flange, wear-plates fixed to the flattened portions, a carrier frictionally mounted upon the journal-box and rotatable with respect thereto, rollers carried by the carrier and lying in the interspaces, said rollers being adapted to wedge between the flange and the wear-plates alternately at opposite ends of the latter, and a dust-ring fixed to the flange and inclosing the periphery of the carrier.

3. A clutch mechanism comprising a driving element having a clutch-face, a driven element having a clutch-face, a clutch-body disposed for engagement with the faces when their respective bodies are moved in either direction, and means for holding the clutching-body inoperative when the driven element rotates at a greater speed than the driving element.

4. A clutch mechanism comprising a driving element having a clutch-face, a driven element having a clutch-face, a carrier and clutch-rollers rotatably mounted upon the carrier in operative relation to the clutch-faces, said carrier being mounted for rotation at a restricted speed under the influence of the driving element, to hold the rollers inoperative when the driven element rotates at a greater speed than the driving element.

In testimony that we claim the foregoing as our own we have hereto affixed our signatures in the presence of two witnesses.

HENRY M. BRENENSTUL.
ALVIN M. CARPENTER.

Witnesses:
DELLA DE HART,
W. H. PEACE.